US007710589B2

(12) United States Patent
Sodeura et al.

(10) Patent No.: US 7,710,589 B2
(45) Date of Patent: May 4, 2010

(54) IMAGE TRANSMITTING APPARATUS, IMAGE TRANSMITTING METHOD, AND COMPUTER READABLE MEDIUM STORING PROGRAM FOR IMAGE TRANSMISSION

(75) Inventors: Minoru Sodeura, Kanagawa (JP); Hiroyoshi Uejo, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 919 days.

(21) Appl. No.: 11/510,578

(22) Filed: Aug. 28, 2006

(65) Prior Publication Data

US 2007/0165268 A1    Jul. 19, 2007

(30) Foreign Application Priority Data

Jan. 17, 2006 (JP) ............................. 2006-008627

(51) Int. Cl.
*G06F 3/12* (2006.01)

(52) U.S. Cl. .................... 358/1.15; 358/1.12; 358/1.14; 358/1.18; 358/403; 358/407; 358/453; 358/470; 382/317

(58) Field of Classification Search ................ 358/1.12, 358/1.14, 1.15, 1.18, 403, 407, 453, 470; 382/317

See application file for complete search history.

(56) References Cited

U.S. PATENT DOCUMENTS 6,980,331 B1 *  12/2005  Mooney et al. ............. 358/400
7,079,275 B2 *   7/2006  Henry et al. ............... 358/1.15

FOREIGN PATENT DOCUMENTS

| JP | A 9-55840 | 2/1997 |
| JP | A 2004-96412 | 3/2004 |

* cited by examiner

*Primary Examiner*—Chan S Park
(74) *Attorney, Agent, or Firm*—Oliff & Berridge, PLC

(57) ABSTRACT

An image transmitting apparatus includes: an address acquiring component that acquires an first address of a document image on the basis of address information other than numbers added to the document image; an address input component that receives input of the second address with respect to the document image; a match determining component that determines whether or not the second address that the address input component has received and the first address that the address acquiring component has acquired match; and a transmitting component that transmits the document image in accordance with the determination result of the match determining component.

11 Claims, 5 Drawing Sheets

IMAGE TRANSMITTING APPARATUS, IMAGE TRANSMITTING METHOD, AND COMPUTER READABLE MEDIUM STORING PROGRAM FOR IMAGE TRANSMISSION

BACKGROUND

1. Technical Field

The present invention relates to an image transmitting apparatus, image transmitting method, and computer readable medium storing a program, which are used for transmitting an image.

2. Related Art

Facsimile machines that prevent the mistransmission of document images are known.

SUMMARY

According to an aspect of the invention, there is provided an image transmitting apparatus including: an address acquiring component that acquires an first address of a document image on the basis of address information other than numbers added to the document image; an address input component that receives input of the second address with respect to the document image; a match determining component that determines whether or not the second address that the address input component has received and the first address that the address acquiring component has acquired match; and a transmitting component that transmits the document image in accordance with the determination result of the match determining component.

BRIEF DESCRIPTION OF THE DRAWINGS

An exemplary embodiment of the invention will be described in detail with reference to the following figures, wherein.

DETAILED DESCRIPTION

Next, an exemplary embodiment of the invention will be described on the basis of the drawings.

Figure 1:
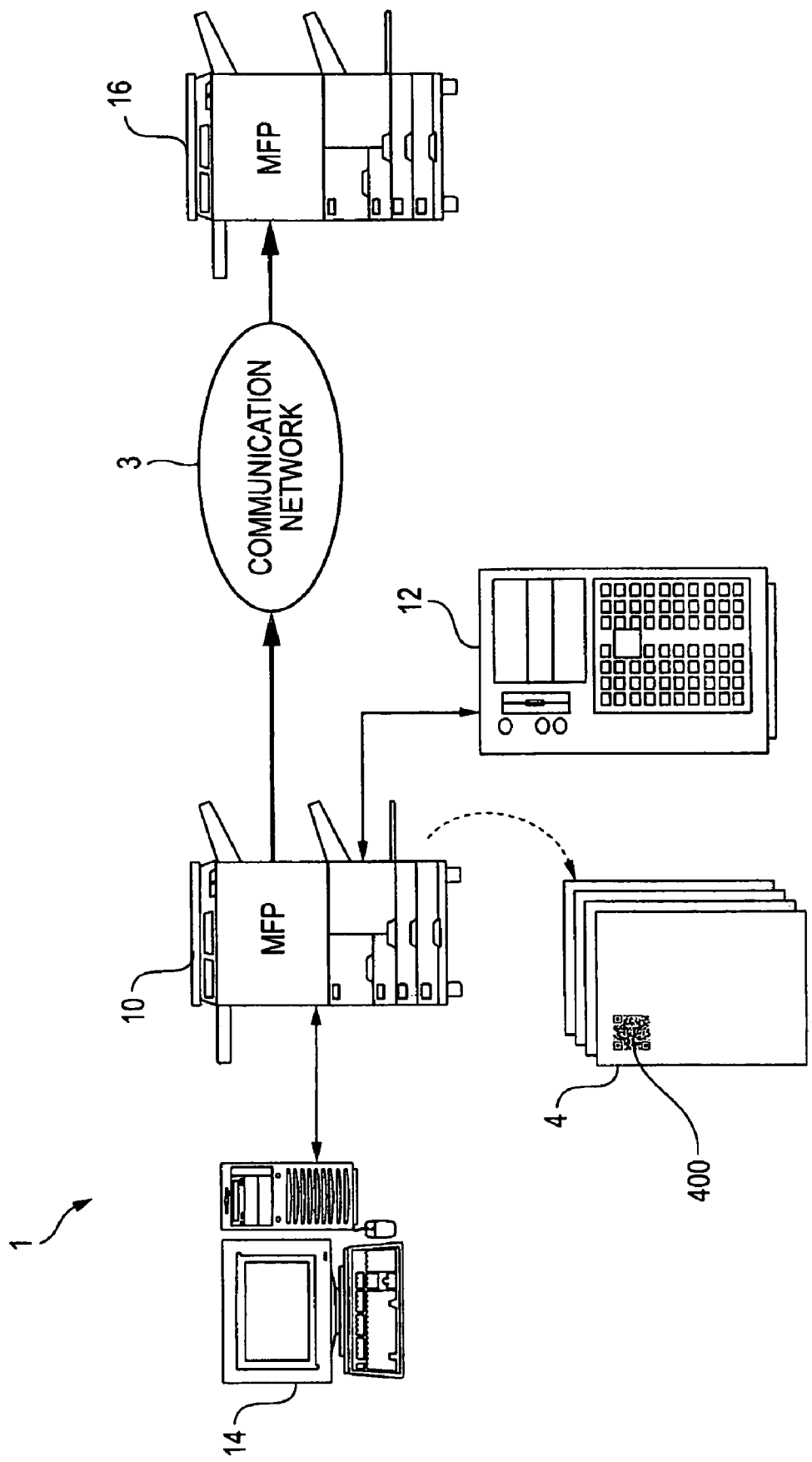
FIG. 1 is a diagram showing the general configuration of an image transmitting system.

FIG. 1 is a diagram showing the general configuration of an image transmitting system 1. The image transmitting system 1 includes, for example, an image forming apparatus 10, a server 12, a personal computer (PC) 14, and an image forming apparatus 16 that is connected to the image forming apparatus 10 via a communication network 3.

The image forming apparatus 10 is a multifunction peripheral (MFP) that includes the functions of a facsimile machine, a printer, and a copier, for example. The image forming apparatus 10 prints images including later-described address information images 400 on recording media 4 such as paper in accordance with a printing instruction from the PC 14 or the like, and transmits, to the image forming apparatus 16 via the communication network 3 by the fax function, images obtained by a later-described image reading device 102 reading the recording media 4 or images (image data) inputted from the PC 14.

The server 12 includes an unillustrated CPU and memory, stores information used in the image transmitting system 1 such as facsimile numbers of the image forming apparatus 10 and 16, and conducts processing with respect to the image forming apparatus 10 and the like. A printer driver and the like of the image forming apparatus 10 are also installed in the PC 14.

Similar to the image forming apparatus 10, the image forming apparatus 16 is a multifunction peripheral (MFP) that includes the functions of a facsimile machine, a printer, and a copier, for example, and receives via the communication network 3 the images and the like transmitted from the image forming apparatus 10.

Next, the details of the image forming apparatus 10 and 16 will be described.

Figure 2:
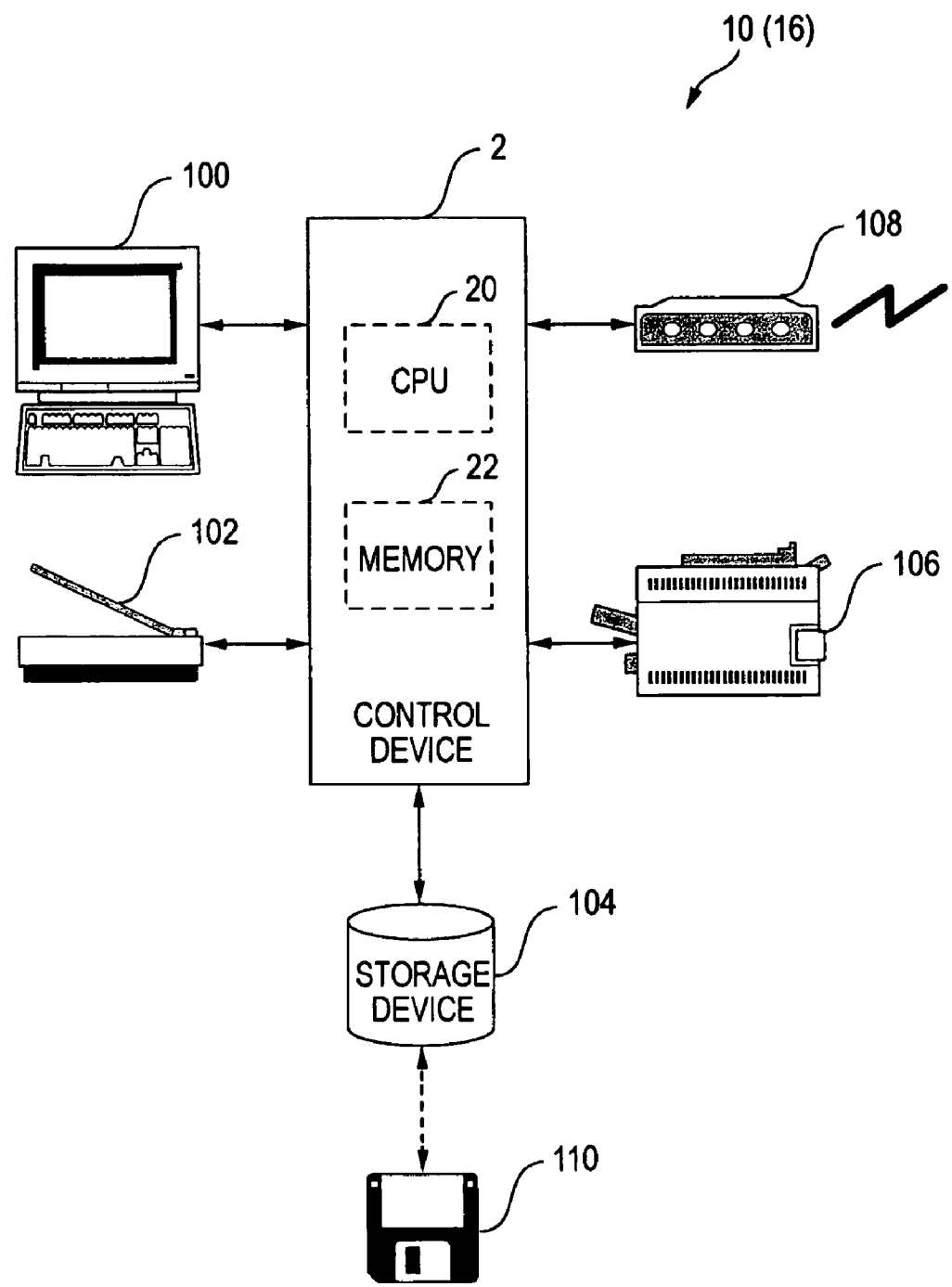
FIG. 2 is a diagram showing the configuration of an image forming apparatus including a function as an image transmitting apparatus.

FIG. 2 is a diagram showing the configuration of the image forming apparatus 10 and 16. The image forming apparatus 10 is configured by a user interface (UI) device 100 that includes a display device, a keyboard, and the like; an image reading device 102 such as a scanner; a storage device 104 such as a hard disk drive and/or a compact disk device; a printing device 106; a communication device 108 equipped with plural network interfaces such as a fax modem and a LAN port; and a control device 2. The control device 2 includes a CPU 20 and a memory 22 and controls the respective parts configuring the image forming apparatus 10. In this manner, the image forming apparatus 10 includes a function as a computer, operates in accordance with software supplied via a storage medium 110 or the communication device 108, and is used by a user as an image transmitting apparatus such as a facsimile machine that transmits document images.

The image forming apparatus 16 has substantially the same hardware configuration as that of the image forming apparatus 10. In other words, the image forming apparatus 16 includes a function as a computer, operates in accordance with software supplied via the storage medium 110 or the communication device 108, and is used by a user as an image transmitting apparatus such as a facsimile machine that transmits document images.

Figure 3:
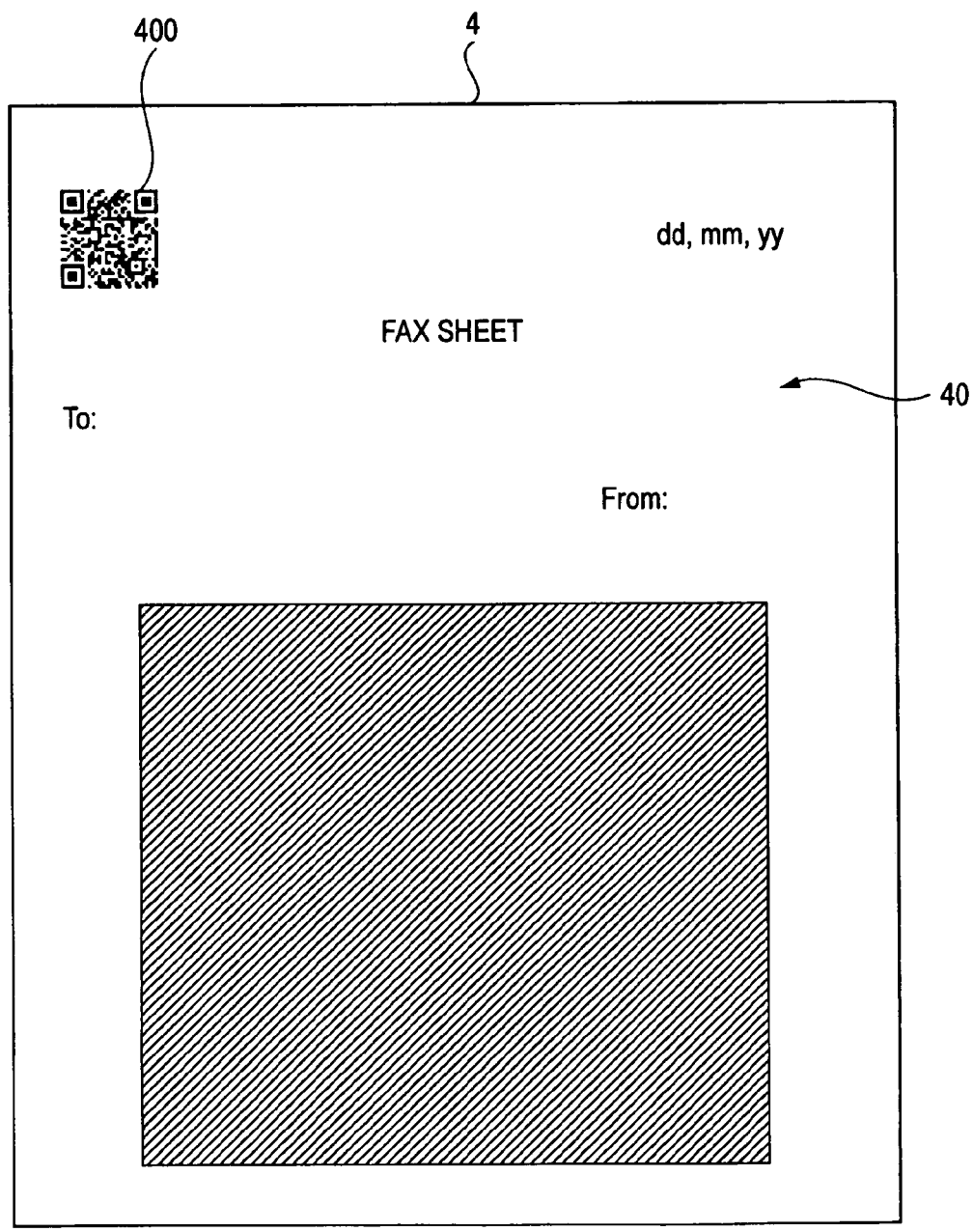
FIG. 3 is a diagram showing an example of a document image that the image forming apparatus transmits with respect to another image forming apparatus.

FIG. 3 is a diagram showing an example of a document image 40 that the image forming apparatus 10 transmits to the image forming apparatus 16.

As shown in FIG. 3, an address information image 400 such as a QR Code (registered trademark), for example, is added to the document image 40 that the image forming apparatus 10 transmits.

The address information image 400 is an image other than numbers that a QR Code generating program that, for example, the PC 14 or the image forming apparatus 10 includes has coded information in which the image forming apparatus 16 is the address of image transmission. The address information image 400 is disposed at an arbitrary position on the document image 40 by the image forming apparatus 10 and is printed on the recording medium 4 together with the document image 40. The coded information that the address information image 400 includes is, for example, the fax number or e-mail address of the image forming apparatus 16.

Further, the address information image 400 may be an image such as a one-dimensional code or an image including information representing the image forming apparatus 10 as the transmission source or a user transmitting an image via the image forming apparatus 10.

Figure 4:
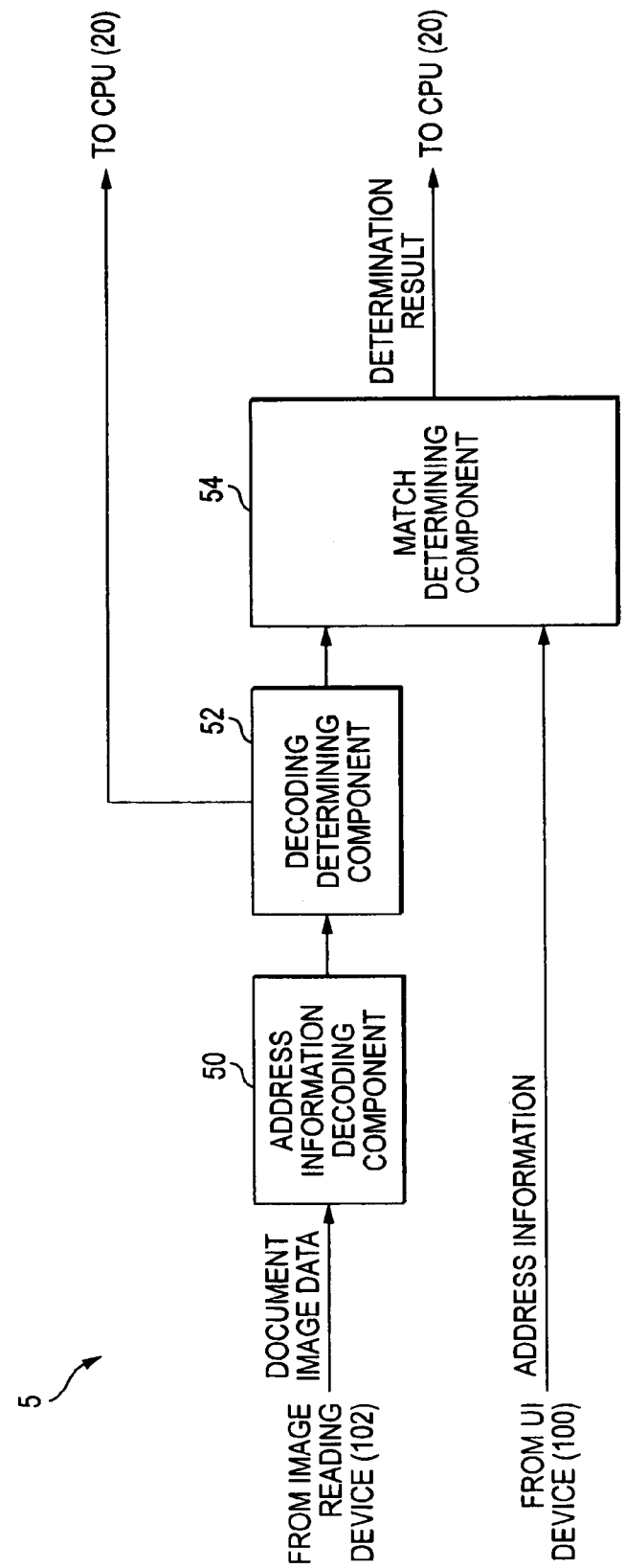
FIG. 4 is a diagram showing the configuration of a processing program executed by a control device 2 when the image forming apparatus operates as a fax machine.

FIG. 4 is a diagram showing the configuration of a processing program 5 that is executed by the control device 2 when the image forming apparatus 10 operates as a facsimile machine.

As shown in FIG. 4, the processing program 5 is configured by an address information decoding component 50, a decoding determining component 52, and a match determining component 54.

The address information decoding component 50 receives the document image data that the image reading device 102 has read, extracts and decodes the address information image 400 added to the document image 40, and outputs the decoded address information, such as a facsimile number, to the decoding determining component 52.

The decoding determining component 52 determines whether or not the address information decoding component 50 is able to normally implement decoding by determining whether or not the address information inputted from the address information decoding component 50 is valid. When the decoding determining component 52 determines that decoding has been normally implemented, it outputs the address information to the match determining component 54, and when the decoding determining component 52 determines that decoding has not been normally implemented, it outputs a signal indicating this to the CPU 20.

The match determining component 54 compares the address information inputted from the decoding determining component 52 and address information such as a fax number inputted from the UI device 100, determines whether or not the sets of address information match, and outputs a signal representing the determination result to the CPU 20.

Next, processing that the image forming apparatus 10 transmits the document image 40 by the fax function will be described.

Figure 5:
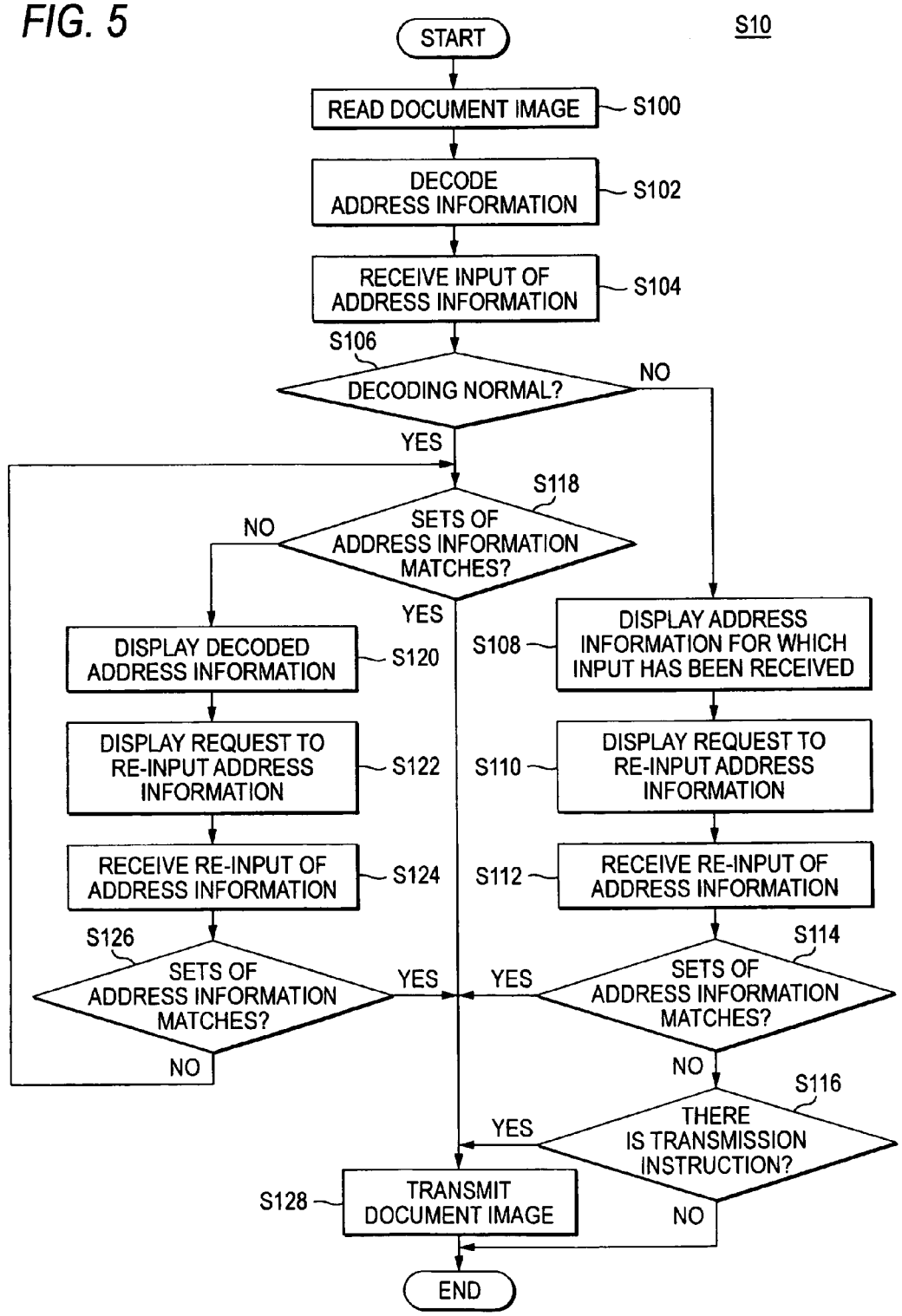
FIG. 5 is a flowchart showing an example of processing (S10) that the image forming apparatus transmits a document image by a fax function.

FIG. 5 is a flowchart showing an example of processing (S10) that the image forming apparatus 10 transmits the document image 40 by the fax function.

As shown in FIG. 5, in step 100 (S100), the image forming apparatus 10 reads the document image by the image reading device 102.

In step 102 (S102), the address information decoding component 50 decodes and acquires the address information.

In step 104 (S104), the UI device 100 receives the input of the address information by the user.

In step 106 (S106), the decoding determining component 52 determines whether or not decoding has been normally implemented by the address information decoding component 50. When the decoding determining component 52 determines that decoding has been normally implemented, the processing moves to the processing of S118, and when the decoding determining component 52 determines that decoding has not been normally implemented, the processing moves to the processing of S108.

In step 108 (S108), the UI device 100 displays to the user the fact that the decoding of the address information image 400 has not been normally implemented by displaying the address information for which input was received.

In step 110 (S110), the UI device 100 conducts display requesting re-input by the user of the address information.

In step 112 (S112), the UI device 100 receives the re-input of the address information by the user.

In step 114 (S114), the CPU 20 determines whether or not the initially inputted address information and the re-inputted address information match. When they match, the processing moves to the processing of S128, and when they do not match, the processing moves to the processing of S116.

In step 116 (S116), the CPU 20 determines whether or not an instruction (transmission instruction) to transmit the document image 40 in accordance with the inputted address information has been received via the UI device 100, for example. When there is a transmission instruction, the processing moves to the processing of step S128, and when there is no transmission instruction, the processing ends.

In step 118 (S118), the CPU 20 determines whether or not the address information that the address information decoding component 50 has decoded and the address information received via the UI device 100 match. When they match, the processing moves to the processing of S128, and when they do not match, the processing moves to the processing of S120.

In step 120 (S120), the UI device 100 displays to the user the fact that the address information inputted via the UI device 100 is wrong by displaying the address information that the address information decoding component 50 has decoded.

In step 122 (S122), the UI device 100 conducts display requesting re-input by the user of the address information.

In step 124 (S124), the UI device 100 receives the re-input of the address information by the user.

In step 126 (S126), the CPU 20 determines whether or not the sets of second address information received before and after the re-input requesting component requests the re-input match. If not, the processing moves back to step S118. If the sets of addresses match, the processing moves to step S128.

In step 128 (S128), the communication device 108 transmits the document image in accordance with the address information.

In this manner, because the address information image 400 that is a QR Code, for example, is easily region-extracted and precisely recognized, even if it is disposed at an arbitrary position on the document image 40, it serves as highly precise compare/contrast information with respect to the address information that the user inputs via the UI device 100.

Further, the address information image 400 may also be configured to include information corresponded to the facsimile number of the image forming apparatus 16 that the server 12 stores, such that the image forming apparatus 10 acquires, using a correspondence table or the like, address information in which the image forming apparatus 16 is the address.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image transmitting apparatus comprising:
   an image reading component that reads a document image to which a first address information has been added, the first address information being coded;
   an address information decoding component that decodes the first address information added to the document image that the image reading component has read;
   an address information input component that receives input of a second address information with respect to the document image;
   a match determining component that determines whether or not the second address information that the address information input component has received and the first address information that the address information decoding component has decoded match;

a transmitting component that transmits the document image in accordance with the determination result of the match determining component;

a decoding determining component that determines whether or not the address information decoding component is able to normally implement decoding of the first address information;

a re-input requesting component that requests re-input of the second address information with respect to the address information input component when the decoding determining component has determined that the address information decoding component is not able to normally implement decoding of the first address information; and a control component that controls the transmitting component to transmit the document image in accordance with the second address information that the address information input component has received when the sets of the second address information that the address information input component has received before and after the re-input requesting component requests the re-input match each other.

2. An image transmitting apparatus comprising:

an image reading component that reads a document image to which a first address information has been added, the first address information being coded;

an address information decoding component that decodes the first address information added to the document image that the image reading component has read;

an address information input component that receives input of a second address information with respect to the document image;

a match determining component that determines whether or not the second address information that the address information input component has received and the first address information that the address information decoding component has decoded match;

a display component that displays the first address information that the address information decoding component has decoded when the match determining component has determined that the second address information that the address information input component has received and the first address information that the address information decoding component has decoded do not match; and a transmitting component that transmits the document image in accordance with the determination result of the match determining component.

3. The image transmitting apparatus of claim 2, further comprising;

a re-input requesting component that requests re-input of the second address information with respect to the address information input component when the match determining component has determined that the second address information that the address information input component has received and the first address information that the address information decoding component has decoded do not match, and a control component that controls the transmitting component to transmit the document image in accordance with the second address information that the address information input component has received when the sets of the second address information that the address information input component has received before and after the re-input requesting component requests the re-input match each other.

4. The image transmitting apparatus of claim 2, further comprising;

a re-input requesting component that requests re-input of the second address information with respect to the address information input component when the match determining component has determined that the second address information that the address information input component has received and the first address information that the address information decoding component has decoded do not match, and a control component that controls such that the re-input requesting component requests the re-input until the second address information that the address information input component has received after the re-input requesting component has requested the re-input matches the first address information that the address information decoding component has decoded.

5. The image transmitting apparatus of claim 2, further comprising;

a re-input requesting component that requests re-input of the second address information with respect to the address information input component when the match determining component has determined that the second address information that the address information input component has received and the first address information that the address information decoding component has decoded do not match, and a control component that controls the transmitting component to transmit the document image in accordance with the second address information that the address information input component has received when the second address information that the address information input component has received after the re-input requesting component has requested the re-input.

6. The image transmitting apparatus of claim 1, further comprising;

a decoding determining component that determines whether or not the address information decoding component is able to normally implement decoding of the first address information, a display component that displays the second address information that the address information input component has received when the decoding determining component has determined that the address information decoding component is not able to normally implement decoding of the first address information, and a transmission instruction input component that receives input instructing the transmitting component whether or not to transmit the document image on the basis of the second address information that the display component has displayed.

7. The image transmitting apparatus of claim 1, wherein the first address information added to the document image includes a fax number representing an address.

8. The image transmitting apparatus of claim 1, wherein the first address information added to the document image includes an e-mail address representing an address.

9. The image transmitting apparatus of claim 7, wherein the first address information added to the document image includes transmission source information.

10. The image transmitting apparatus of claim 1, wherein the first address information added to the document image includes a two-dimensional code.

11. The image transmitting apparatus of claim 1, wherein the first address information added to the document image includes a one-dimensional code.

* * * * *